US008977629B2

(12) United States Patent
Goswami et al.

(10) Patent No.: US 8,977,629 B2
(45) Date of Patent: Mar. 10, 2015

(54) IMAGE-BASED POPULARITY PREDICTION

(75) Inventors: Anjan Goswami, Sunnyvale, CA (US); Sung Hwan Chung, Fremont, CA (US)

(73) Assignee: eBay Inc., San Jose, CA (US)

( * ) Notice: Subject to any disclaimer, the term of this patent is extended or adjusted under 35 U.S.C. 154(b) by 139 days.

(21) Appl. No.: 13/462,179

(22) Filed: May 2, 2012

(65) Prior Publication Data
US 2012/0303615 A1    Nov. 29, 2012

Related U.S. Application Data

(60) Provisional application No. 61/489,669, filed on May 24, 2011.

(51) Int. Cl.
*G06F 17/00*    (2006.01)
*G06F 17/30*    (2006.01)
(Continued)

(52) U.S. Cl.
CPC    *G06Q 30/02* (2013.01); *G06K 9/46* (2013.01); *G06F 17/30* (2013.01); *G06F 17/00* (2013.01);
(Continued)

(58) Field of Classification Search
CPC ......... G06F 17/00; G06F 17/30; G06F 17/21; G06Q 30/02; G06Q 30/00; G06T 3/60; G06K 9/32
USPC .............. 707/705–710, 723, 758, 765–770, 707/780–782, 804–805, 688, 728–730, 748, 707/749; 709/203, 206, 215–220; 705/14.41, 14.23, 27.1; 382/162, 164, 382/168, 171, 190, 193–194, 219
See application file for complete search history.

(56) References Cited

U.S. PATENT DOCUMENTS 5,751,286 A * 5/1998 Barber et al. ................. 715/835
2002/0055891 A1 * 5/2002 Yang ............................... 705/27
(Continued)

FOREIGN PATENT DOCUMENTS

WO    WO 2005/099281    * 10/2005
WO    WO 2011/127361    * 10/2011

OTHER PUBLICATIONS

Mohammad Norouzi et al., "Stacks of Convolutional Restricted Boltzmann Machines for Shift-Invariant Feature Learning", IEEE, 2009,. pp. 2735-2742.*
(Continued)

*Primary Examiner* — Srirama Channavajjala
(74) *Attorney, Agent, or Firm* — Schwegman Lundberg & Woessner, P.A.

(57) ABSTRACT

A machine may be configured to access an image of an item described by a description of the item. The machine may determine an image quality score of the image based on an analysis of the image. A request for search results that pertain to the description may be received by the machine, and the machine may present a search result that references the item's image, based on its image quality score. Also, the machine may access images of items and descriptions of items and generate a set of most frequent text tokens included in the item descriptions. The machine may identify an image feature exhibited by an item's image and determine that a text token from the corresponding item description matches one of the most frequent text tokens. A data structure may be generated by the machine to correlate the identified image feature with the text token.

21 Claims, 11 Drawing Sheets

(51) Int. Cl.
*G06K 9/00* (2006.01)
*G06K 9/46* (2006.01)
*G06K 9/68* (2006.01)
*G06Q 30/02* (2012.01)
*G06K 9/62* (2006.01)

(52) U.S. Cl.
CPC .. *G06K 9/00* (2013.01); *G06K 9/68* (2013.01); *G06F 17/30247* (2013.01); *G06F 17/30268* (2013.01); *G06K 9/6201* (2013.01); *G06K 9/6231* (2013.01)
USPC ........... 707/748; 707/688; 707/723; 707/728; 707/749; 707/758; 382/162; 382/164; 382/168; 382/190; 382/219

(56) References Cited

U.S. PATENT DOCUMENTS

| | | | |
|---|---|---|---|
| 2004/0059645 A1* | 3/2004 | Wirth, Jr. | 705/27 |
| 2004/0218837 A1* | 11/2004 | Shiyama | 382/305 |
| 2005/0013502 A1* | 1/2005 | Lim | 382/254 |
| 2005/0055344 A1* | 3/2005 | Liu et al. | 707/3 |
| 2005/0089246 A1* | 4/2005 | Luo | 382/286 |
| 2005/0157926 A1* | 7/2005 | Moravec et al. | 382/173 |
| 2006/0147107 A1* | 7/2006 | Zhang et al. | 382/159 |
| 2006/0285747 A1* | 12/2006 | Blake et al. | 382/180 |
| 2007/0008621 A1* | 1/2007 | Satoh et al. | 359/465 |
| 2007/0174872 A1* | 7/2007 | Jing et al. | 725/46 |
| 2008/0109327 A1* | 5/2008 | Mayle et al. | 705/27 |
| 2008/0144943 A1* | 6/2008 | Gokturk et al. | 382/224 |
| 2010/0046842 A1* | 2/2010 | Conwell | 382/218 |
| 2010/0076960 A1* | 3/2010 | Sarkissian et al. | 707/722 |
| 2010/0189354 A1* | 7/2010 | de Campos et al. | 382/190 |
| 2011/0093361 A1* | 4/2011 | Morales | 705/26.62 |
| 2011/0149117 A1* | 6/2011 | Vendrig | 348/239 |

OTHER PUBLICATIONS

Agarwal, Deepak, et al., "Translating Relevance Scores to Probabilities for Contextual Advertising", CIKM '09, (Nov. 2-6, 2009), 4 pgs.
Bach, J. R, et al., "Virage image search engine: an open framework for image management", Proc. SPIE vol. 2670, Storage and Retrieval for Still Image and Video Databases IV, Ishwar K. Sethi; Ramesh C. Jain; Eds, (1996), 76-87.
Bengio, Y., et al., "Greedy Layer-Wise Training of Deep Networks", Advances in Neural Information Processing Systems, (2007), 8 pgs.
Bengio, Yoshua, "Learning Deep Architectures for AI", Foundations and Trends in Machine Learning. vol. 2, No. 1, (2009), 1-127.
Carterette, Ben, et al., "Evaluating Search Engines by Modeling the Relationship Between Relevance and Clicks", Advances in Neural Information Processing Systems, (2007), 8 pgs.
Chapelle, Olivier, et al., "A Dynamic Bayesian Network Click Model for Web Search Ranking", Proceedings of the International Conference on World Wide Web, (Apr. 20-24, 2009), 10 pgs.
Cheng, Haibin, et al., "Personalized Click Prediction in Sponsored Search", Proceedings of the International Conference on Web Search and Data Mining, 2010., (2010), 351-359.
Cortes, Corinna, et al., "Support-Vector Networks", Machine Learning 20(3), (1995), 273-297.
Dalal, N, et al., "Histograms of Oriented Gradients for Human Detection", (2005), 8 pgs.
Dembczynski, K, et al., "Predicting Ads' Click-Through Rate with Decision Rules", Workshop on Target and Ranking for Online Advertising in WWW, 2008., (Apr. 21-25, 2008), 8 pgs.
Goswami, A., et al., "Assessing product image quality for online shopping", Proc. SPIE 8293, Image Quality and System Performance IX, 82930L, (Jan. 24, 2012), 12 pgs.
Goswami, N, et al., "A Study on the Impact of Product Images on User Clicks for Online Shopping", WWW (Companion Volume), (Mar. 28-Apr. 1, 2011), 45-46.
Graepel, Thore, et al., "Web-Scale Bayesian Click-Through Rate Prediction for Sponsored Search Advertising in Microsoft's Bing Search Engine", Proceedings of the International Conference on Machine Learning, (2010), 8 pgs.
Hasler, D., et al., "Measuring colorfulness in natural images", Proc. SPIE. 5007, Human Vision and Electronic Imaging VIII 87, (Jun. 12, 2003), 87-95.
Hassan, Ahmed, et al., "Beyond DCG: User Behavior as a Predictor of a Successful Search", Proceedings of the International Conference on Web Search and Data Mining, (Feb. 4-6, 2010), 10 pgs.
Hillard, D., et al., "Improving Ad Relevance in Sponsored Search", Proceedings of the International Conference on Web Search and Data Mining, (2010), 361-369.
Hinton, G, et al., "Reducing the Dimensionality of Data with Neural Networks", Science, 313 (5786), (2006), 504-507.
Hinton, Geoffrey, et al., "A Fast Learning Algorithm for Deep Belief Nets", Neural Computation, 18(7), (2006), 1527-1554.
Hinton, Geoffrey, "Training Products of Experts of Minimizing Contrasitve Divergence", Neural Computation, 14(8), (2002), 1771-1800.
Jain, V, et al., "Learning to Re-Rank: Query-Dependent Image Re-Ranking Using Click Data", Proceedings of the International Conference on World Wide Web, (Mar. 28-Apr. 1, 2011), 10 pgs.
Jing, Y, et al., "Pagerank for Product Image SEarch", Proceedings of the International Conference on World Wide Web, (Apr. 21-25, 2008), 307-315.
Josang, A, et al., "A Survey of Trust and Reputation Systems for Online Service Provision", Decision Support Systems, 43(2), (2007), 618-644.
Konig, A C, et al., "Click-through Prediciton for New Queries", SIGIR, (Jul. 19-23, 2009), 8 pgs.
Lee, H, et al., "Convolutional Deep Belief Networks for Scalable Unsupervised Learning of Hierarchical Representations", Proceedings on the International Conference on Machine Learning, (2009), 8 pgs.
Lee, H, et al., "Sparse Deep Belief Network Model for Visual Area V2", NIPS, 20, (2008), 8 pgs.
Lee, Su-In, et al., "Efficient L1 Regularized Logisitc Regression", American Association for Artificial Intelligence, (2006), 401-408.
Lowe, D., "Distinctive Image Features from Scale-Invariant Keypoints", International Journal of Computer Vision, 60(2), (2004), 91-110.
Park, J., et al., "On-line product presentation: Effects on mood, perceived risk, and purchase intention", Psychology & Marketing, 22(9), (Sep. 2005), 695-719.
Peli, E, "Contrast in Complex Images", Journal of Optical Society of America, 7(10), (Oct. 1990), 2032-2040.
Piwowarski, B., et al., "Predictive user click models based on click-through history", CIKM '07 Proceedings of the Sixteenth ACM Conference on Conference on Information and Knowledge Management, (2007), 175-182.
Raina, R, et al., "Large-scale Deep Unsupervised Learning using Graphics Processors", ICML, (2009), 873-880.
Ranzato, M, et al., "Sparse Feature Learning for Deep Belief Networks", Advances in Neutal Information Processing Systems, (2007), 8 pgs.
Rother, Carsten, et al., "GrabCut—Interactive Foreground Extraction using Iterated Graph Cuts", ACM Transactions on Graphics, 23(3), (2004), 309-314.
Simoncelli, E, et al., "Natural Image Statistics and Neural Representation", Annual Review of Neural Science, 24(1), (2001), 1193-1216.
Sohn, K, et al., "Efficient Learning of Sparse, Distributed, Convolutional Feature Representations for Object Recognition", ICCV, (2011), 8 pgs.
Vasconcelos, N, "From Pixels to Semantic Spaces: Advances in Content-based Image Retrieval", Computer, 40, (Jul. 2007), 20-26.

(56) References Cited

OTHER PUBLICATIONS

Wang, X., et al., "Click prediction for product search on C2C web sites", ADMA'10 Proceedings of the 6th International Conference on Advanced Data Mining and Applications—vol. Part II, (2010), 387-398.

Wu, Wei, et al., "Learning a Robust Relevance Model for Search Using Kernel Methods", Journal of Machine Learning Research 12, (2011), 1429-1458.

Wu, X., et al., "Predicting the conversion probability for items on C2C ecommerce sites", CIKM '09 Proceedings of the 18th ACM Conference on Information and Knowledge Management, (2009), 1377-1386.

Zhu, Z., et al., "A Novel Click Model and Its Applications to Online Advertising", Proceedings of the Third ACM International Conference on Web Search and Data Mining, (Feb. 5, 2010), 10 pgs.

* cited by examiner

US 8,977,629 B2

IMAGE-BASED POPULARITY PREDICTION

RELATED APPLICATION

This application claims the priority benefit of U.S. Provisional Patent Application No. 61/489,669, filed May 24, 2011, which is incorporated herein by reference in its entirety.

TECHNICAL FIELD

The subject matter disclosed herein generally relates to the processing of data. Specifically, the present disclosure addresses systems and methods to facilitate image-based popularity prediction.

BACKGROUND

A product may be manufactured by a manufacturer and available for purchase from a seller. For example, the product may take the form of a good (e.g., a physical object), a service (e.g., performed by a service provider), information (e.g., digital media), a license (e.g., authorization to access something), or any suitable combination thereof. An item may be a specimen (e.g., an individual instance) of the product, and multiple items may constitute multiple specimens of the product. Accordingly, a seller of a product may seek to merchandise one or more items as specimens of the product.

In merchandising an item, the seller may use a network-based system to present the item to a user of the network-based system (e.g., a potential buyer of the item). Examples of network-based systems include commerce systems (e.g., shopping websites), publication systems (e.g., classified advertisement websites), listing systems (e.g., auction websites), and transaction systems (e.g., payment websites). The item may be presented within a document (e.g., a webpage) that describes the item or product. In shopping for an item, one or more users may search the network-based system (e.g., by submitting queries) for such documents or similar information regarding details of the item or product.

BRIEF DESCRIPTION OF THE DRAWINGS

Some embodiments are illustrated by way of example and not limitation in the figures of the accompanying drawings.

DETAILED DESCRIPTION

Figure 1:
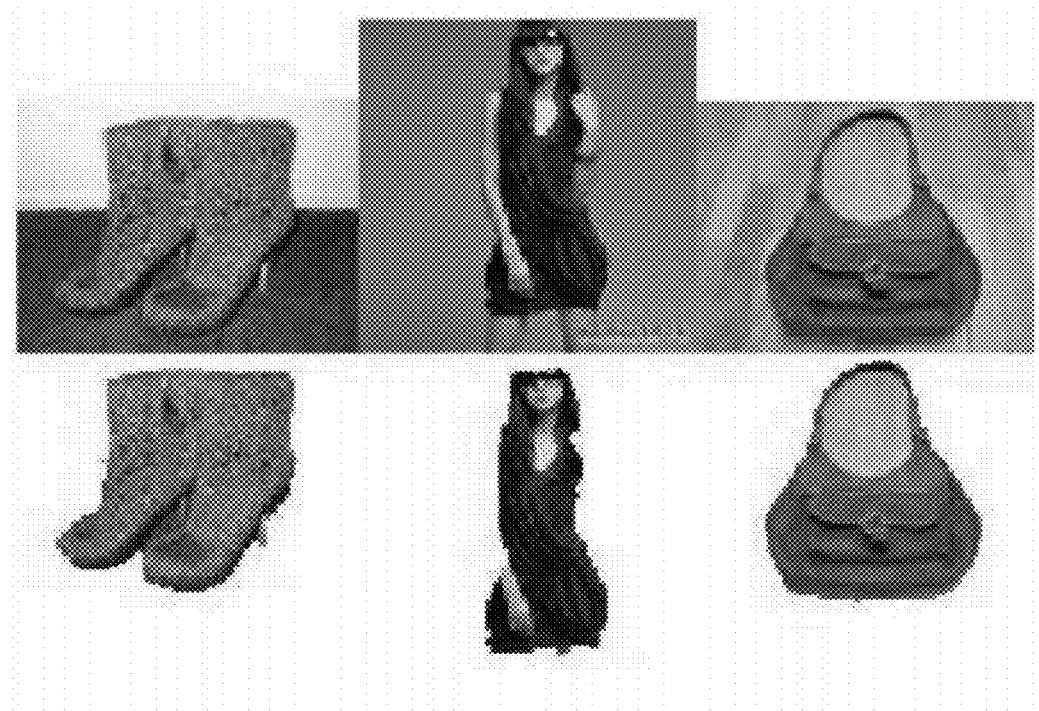
FIG. 1 is a set of automatically segmented images, according to some example embodiments.

Example methods and systems are directed to image-based popularity prediction (e.g., predicting item popularity using images for online shopping). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Item popularity (e.g., product popularity) is discussed herein in the example context of shopping search engines (e.g., product search engines) with respect to clicks that correspond to items, sales of the items, and queries submitted to such search engines. An expression combining clicks and sales normalized by impressions may follow a log-normal distribution. The logarithm (e.g., "log") of such scores may be learned with reasonable accuracy from combinations of text, price, and image features. Image features may often improve a root mean square error (RMSE) for regression models, although their significance may vary in different categories. In experiments conducted, photographic features (e.g. brightness, contrast, etc.) and semantic or object features (e.g., foreground color histograms, texture histograms, category-dependent Restricted Boltzmann Machine (RBM) features, etc.) were extracted from item images. The use of a Restricted Boltzmann Machine may be especially well-suited for extracting category-level features from item images since these can be learned algorithmically. Restricted Boltzmann Machines accordingly may further improve regression performance. Regression models may be trained for each item category or a subset thereof. Moreover, since image features may be drastically different in different item categories, knowledge of image feature importance may be useful in understanding consumer preferences in visually driven categories (e.g., fashion).

Predicting the popularity of items may impact revenues of network-based services such as, for example, shopping search engines. Accordingly, prediction of item popularity may be performed by, for example, one or more network-based systems (e.g., commerce systems, publication systems, listing systems, media archival systems, image sharing systems, visual search engines, shopping search engines, or any suitable combination thereof), and in some particular examples, by one or more popularity prediction machines included in one or more of such network-based systems. Considering the example context of a shopping search engine, a potential difference between a shopping search engine and a generic web search engine is that a shopping search result often includes thumbnail images of the items in the search result page. Another potential difference between a shopping search and a generic web search is that search results from the former typically include images along with potentially semi-structured text data. Additionally, the notion of popularity may be specific to a shopping search. A popularity score for items may be defined for use in a network-based service, described in the example context of a shopping search engine. A system (e.g., a suitably programmed computer system) may be configured to determine (e.g., estimate) such popularity scores by using a regression model combining image features along with other standard features, such as, for example, text and price of the corresponding items. Moreover, the system may obtain better regression performance by using semantic image features instead of photographic features. Additionally, Restricted Boltzmann Machine (RBM) features may be learned (e.g., machine-learned) from a selected set of training samples and hence reduce manual processing in image feature selection. Some results on ranking of the image features in an example regression model are reported herein. Accordingly, the ranking of image features may be informative about user preferences for special attributes such as color, shapes, or textures of items in visually driven categories of products (e.g., fashion).

Predicting the popularity of an item may facilitate merchandising (e.g., recommending, suggesting, or advertising) one or more products or items. This facilitation may be helpful where a product or item has little or no corresponding data suggestive of user behavior (e.g., a history of clickthroughs, sales, or impressions). In various example embodiments, popularity prediction may be performed with respect to the items (e.g., items that are newly added to a system or a database), items with at least partially unstructured descriptions (e.g., free-form text), items with corresponding data descriptive of non-behavioral characteristics (e.g., an image, a text description, or a price), or any suitable combination thereof. Improved predictions with respect to the popularity of an item may therefore facilitate ranking the item among search results, determining whether to merchandise the item to one or more users, determining whether to apply a promotion to the item, or any suitable combination thereof.

Click Prediction Framework
Click Prediction Model

It may be a goal of a shopping search engine (e.g., a product search engine) to present a list of products relevant to a query. In typical scenarios, a user clicks on a product listing if he or she is interested in buying the product. Hence, user clicks may be a strong indicator of buying intent.

Click prediction may be modeled as a binary classification problem. In particular, logistic regression may be used as a classifier to predict the probability of a click from information describing the query, the product (e.g., item), and the user. Thus, it may be helpful to estimate the following conditional probability: Pr (click=1|query and item).

The conditional probability of click or no-click, given the features, may be written using the logit function as follows:

$$Pr(y=1 \mid x) = \frac{\exp(w^T x)}{1 + \exp(w^T x)}.$$

Here, $x \in \mathbb{R}^n$ denotes a vector of feature variables, and $y \in \{0, 1\}$ denotes no-click and click classes, respectively. Each data point $(x_i, y_i)$, where $i \in \{1, \ldots, m\}$, corresponds to the i-th query pair. The logistic regression model has parameters $w \in \mathbb{R}^n$ that need to be learned, and the maximum likelihood of learning of logistic regression (e.g., with the entire set of training examples) may be expressed as follows:

$$\min_w \frac{1}{m} \sum_{i=1}^{m} \log(1 + \exp(-y_i(x_i^T w)))$$

Feature Selection

Any number of features may be supported by a popularity prediction machine. Many standard classification algorithms tend to have an increased risk of over-fitting, when using large numbers of features. To address this risk, example embodiments of a popularity prediction machine may use an $L_1$ regularized logistic regression to perform feature selection. An $L_1$ logistic model for feature selection may solve the following optimization problem:

$$\min_w \frac{1}{m} \sum_{i=1}^{m} \log(1 + \exp(-y_i(x_i^T w))) + \lambda \sum_{i}^{n} |w_i|$$

where the variables are $w \in \mathbb{R}^n$ and $\lambda > 0$. The regularization parameter $\lambda$ controls the number of nonzero components in w, and it is determined by cross-validation. Prior to using the $L_1$ regularized logistic regression for feature selection, features may be normalized. In experiments, $L_1$ regularized logistic regressions yielded significant improvements in performance.

Baseline (Non-Image) Features

Although image features are discussed at length herein, the following features may be used as standard features in solving other search problems or click prediction problems. Some example embodiments of the popularity prediction machine may use one or more of the features for baseline models.

Item Features

Total cost: The total cost may be a sum of a product price, tax, and a shipping cost.

Shipping cost: The shipping cost may be a cost to ship a product or item.

Condition: The condition may be a discrete variable denoting whether the product or item is new, used, or refurbished.

Query Features

Query-item title text match: This may be a score that captures the quality (e.g., strength or "goodness") of a text match between a query and an item title, considering proximity of query words in the item title. Example embodiments of a query prediction machine may consider the length of a minimum span in the title that contains the query words as a measure of proximity. In some example embodiments, every item title in the search results must contain all of the query words.

Query clicks over impression: This feature may represent a number of clicks per impression for a given query. This may have the effect of measuring how often clicks happen for a particular query.

Seller Features

Seller reputation: A seller reputation may be computed based on several factors. For example, a seller reputation may be computed using user ratings given by buyers.

Seller-item click through rate: This feature may represent an average click through rate for all items listed by a seller.

Seller-trust: This feature may represent a probability that a buyer will experience a problem with the seller (e.g., a defective item, delayed shipping, etc.).

Image Features

Image features may be categorized into two distinct groups—photographic features and semantic features (e.g., object features). As used herein, "photographic" features are directly derived from image color and intensity values and are independent of the content of the images. In contrast, as used herein, "semantic" features are descriptions of the contents of the images (e.g., object shapes, colors, and textures). Semantic features may also be called "object" features (e.g., features of an object depicted in an image).

Image Segmentation

Before computing photographic and semantic features from an image, it may be useful to segment the image into foreground and background portions of the image (e.g., into the foreground and the background of the image). Segmentation may facilitate one or more of the features discussed herein and may be performed by a popularity prediction machine (e.g., a computer system configured by one or more software modules). For instance, rather than computing color and texture histograms from the entire image, segmentation allows their extraction from only the portion of the image that belongs to the item (e.g., the foreground). For this purpose, a popularity prediction machine may use an automated segmentation process (e.g., GrabCut).

The segmentation process (e.g., segmentation algorithm) may include an interactive image segmentation tool in which the user provides a rectangular bounding box for the foreground object. Once the box is provided, all the pixels outside of the bounding box may be marked as the background. From these pixels, the algorithm may compute a distribution of background colors and use this distribution to iteratively determine (e.g., estimate) one or more foreground sections and one or more background sections within the bounding box. In some example embodiments, users may provide additional foreground and background markers in between iterations.

A segmentation algorithm may be automated (e.g., as implemented by a popularity prediction machine) by programming the algorithm to choose a bounding box that is slightly smaller than the item image. This may have the effect of using the edge pixels of the item image to represent the background colors. One potential reason for this is that, according to various example embodiments, a picture of an item (e.g., as submitted by a seller of the item to an auction website) has the item positioned at the center of the picture and spanning most of the picture's width and height. In other example embodiments (for instance, where all or the majority of the image is segmented as the background), the algorithm may be programmed to determine (e.g., select or choose) a fixed size rectangle around the center of the image as the foreground.

In experiments conducted, an implementation of an automated image segmentation process works well. FIG. 1 shows automatically segmented examples. The performance of an automatic segmentation algorithm may be measured (e.g., by a popularity prediction machine) by running the algorithm against a number of manually segmented reference images (e.g., 1000 validation images). In FIG. 1, the top row shows the original images. The bottom row shows the segmented images with the background whitened out. The reference images may be collected from one or more sub-categories of a category for items related to "fashion". Table 1 shows precision and recall of the segmentation algorithm used in the experiments conducted.

TABLE 1

Performance of an automated segmentation algorithm against manually segmented validation images

| Category | Precision | Recall |
|---|---|---|
| Men's Pants | .815 | .781 |
| Women's Dresses | .726 | .777 |

TABLE 1-continued

Performance of an automated segmentation algorithm against manually segmented validation images

| Category | Precision | Recall |
|---|---|---|
| Women's Shoes | .811 | .844 |
| Combined | .782 | .803 |

Photographic Features

Photographic features may be divided into three types: Global Features, Regional Features, and Image Quality Score.

Global Features

Aspect Ratio: This is an image height divided by its width.

Brightness: This is an average of gray scale intensity values of all pixels in an image. Some example embodiments use the following expression to convert from red-green-blue (RGB) values to grayscale values:

$0.3R+0.6G+0.1B$

Dynamic Range: This is a range of the grayscale values, defined as (max-min). Some example embodiments discard outlier pixels to make this score more robust.

Contrast: This quantity represents visual properties that make an object appear clearer. Various example embodiments may use different kinds of contrast measurements (e.g., measures based on human perception). Example embodiments explored by experiment used a root mean square contrast, computed as follows:

$$\sqrt{\frac{1}{MN}\sum_{i=0}^{N-1}\sum_{j=0}^{M-1}(I_{ij}-\bar{I})^2}$$

where M×N is the size of the image, I is the grayscale intensity value of a pixel, and $\bar{I}$ is the average intensity value.

Regional Features

In addition to the global features described above, certain example embodiments (e.g., of the popularity prediction machine) generate one or more of the following region-based photographic features. In certain example instances, there may be one or more semantic elements to these features (e.g., due to dependence on image segmentation). Nonetheless, regional features may be treated as photographic features rather than semantic features.

Lightness of Background: In various example embodiments, good product images (e.g., of high visual quality) may tend to have a light colored background. Accordingly, the RGB distances of the background pixels may be computed (e.g., by the popularity prediction machine) from a pure white pixel by taking their mean and standard deviation from the pure white pixel. Pure white color may be defined as RGB values (255, 255, 255), and an L2 norm may be used to compute the distance. Experiments conducted used a quantity $\alpha\mu+\beta\sigma$, where $\mu$ is the mean and $\sigma$ is the standard deviation. $\alpha$ and $\beta$ are two constants. In some example embodiments, $\alpha=1$ and $\beta=0.3$.

Uniformity of Background: In certain example embodiments, a good product image may lack a high variance in the background pixels. Hence, this feature may be computed (e.g., by the popularity prediction machine) as the standard deviation of the grayscale intensity values of the background.

Colorfulness of Foreground: Colorfulness may be treated as a quantity that is related to the human perception of colors. Although various example embodiments may use one or more of many variants of colorfulness, certain example embodiments use an expression based on an RGB (e.g., standard RGB (sRGB)) color space.

Ratio of Background to Foreground Area: According to various example embodiments, the ratio between the foreground area and the background area may be computed (e.g., by the popularity prediction machine). A larger ratio may indicate that the image size of the product is larger in the image (e.g., in the frame of the image).

Background and Foreground Brightness Difference: In certain example embodiments, the difference in brightness between the background and the foreground is captured (e.g., by the popularity prediction machine). A bigger value may imply that the object is more clearly visible.

Background and Foreground Contrast Difference: According to some example embodiments, the contrast between the background and the foreground may be captured (e.g., by the popularity prediction machine). A higher contrast may have the effect of better accentuating the product (e.g., an item shown in the image).

Image Quality Score

In some example embodiments, a system (e.g., the popularity prediction machine) is configured to compute an image quality score that is directly correlated with human perception of product image quality. For this purpose, the system may implement a machine learning approach where humans label images based on their perceived quality and the system applies machine-learning to learn the relationship between various photographic features and the perceived quality.

In example embodiments explored by experiment, the following guidelines were established to help users in their labeling tasks. Item image qualities were defined at three levels:

Good: These images may be professional quality product images. These images may exhibit good photographic qualities like high brightness, strong contrast between foreground and background, clean and uniform background, sharp focus, etc. Such images may show the product very clearly.

Poor: These images may be poorly captured images. These images may exhibit poor brightness, poor contrast, blurry lines, cluttered background, etc.

Fair: These images may fall somewhere between good and poor images. These images may be relatively well shot but may be distinguishable from the images that are found on high end retail websites.

In the experiments conducted with some example embodiments, 586 people labeled approximately 52,000 images with the above tags. Then, a system (e.g., a popularity prediction machine) trained a multi-class classifier with stochastic-gradient boosted decision trees using the photographic features described above. Each image was labeled by multiple people, and a majority-voting scheme was used to determine a label for each image. The trained classifier exhibited approximately 70% overall accuracy across all the categories.

In addition to predicting the quality class, the system computed a numeric quality score as a more fine grained measure of quality. As an example, the quality score was computed as a weighted average of the class probabilities as follows:

$$\Sigma_{c=1}^{c=3} w_c P(c)$$

where c={poor=1, fair=2, good=3} is the quality class, P is the class probability, and $w_i$ is the weight for each class. In the experiments, $w_1$=1, $w_2$=2, $w_3$=3 and K=85. Various example embodiments may show strong connections between such scores and human judged relevance for web search results. Results of the experiments show that the quality score may be a strong relative measure of image qualities. Table 2 shows predicted quality scores of example images.

TABLE 2

Examples of predicted quality scores

| Image 1 | Image 2 | Image 3 |
|---------|---------|---------|
| 233     | 137     | 98      |

Besides using these scores as a feature in the experiments, the system may use such scores to successfully filter out unprofessional looking pictures.

Semantic or Object Features

Three types of semantic features (e.g., object features) were used in the example embodiments explored by experiment: color histograms, texture histograms, and shape features. The shape features may be automatically generated by a sparse Convolutional Restricted Boltzmann Machine.

Color Histogram

Once an image is segmented, foreground color pixel values may be extracted, for example, in hue-saturation-value (HSV) format. This extraction may be performed by the popularity prediction machine. Then, these pixel HSV values may be quantized (e.g., by the popularity prediction machine) into a histogram (e.g., an 11 bucket histogram). The buckets of the histogram may be divided into black, white, and gray buckets, and in 8 hue buckets, which may be uniformly spaced. According to various example embodiments, a pixel with a value below a certain threshold is counted as a black pixel.

Texture Histogram

In various example embodiments, one or more filters (e.g., horizontal and vertical Sobel filters) may be applied on a grayscale image as follows:

$$G_y = \begin{bmatrix} 1 & 2 & 1 \\ 0 & 0 & 0 \\ -1 & -2 & -1 \end{bmatrix} * I$$

$$G_x = \begin{bmatrix} -1 & 0 & 1 \\ -2 & 0 & 2 \\ -1 & 0 & 1 \end{bmatrix} * I$$

where * is the convolution operator and I is the grayscale image matrix.

Then, the magnitude of the edge response at each position may be computed (e.g., by the popularity prediction machine) by performing the following element-wise operation:

$$\|G\| = \sqrt{G_x^2 G_y^2}$$

The popularity prediction machine may then build an 8-bucket histogram that captures edge responses within the foreground. In various example embodiments, items with strong textures may have many strong edge responses while textureless items may have weak edge responses. Some example embodiments do not take into account directions of texture edges.

Restricted Boltzmann Machine Features

In certain example embodiments, a system (e.g., the popularity prediction machine) uses a variant of a Restricted Boltzmann Machine to automatically learn filters that capture representative object shapes and are robust to certain transformations (e.g., translations). An RBM is a generative probability model that may be used in machine-learning to learn features or to initialize neural network connections in an unsupervised manner. In a basic form, an RBM models the joint probability distribution of observed and hidden variables using the following example equations:

$$P(v, h; \theta) = \frac{1}{Z(\theta)} e^{-E(v,h;\theta)} \quad (1)$$

$$E(v, h; \theta) = -v^T W h - b^T v - a^T h \quad (2)$$

where v and h denote visible and hidden variable vectors respectively, and $Z(\theta)$ is the normalization constant. W is the connection weight matrix between visible and hidden units. In some example embodiments, $W_{ij}$ represents the symmetric interaction between $v_i$ and $h_j$. b and a are bias terms for visible and hidden units, respectively.

Filters (e.g., W in equation (2)) that are obtained through unsupervised RBM training may be very effective features in various image processing tasks. According to various example embodiments, unsupervised RBM training may be performed by maximizing the following probability (e.g., using a technique called Contrastive Divergence, a type of a stochastic gradient descent):

$$P(v; \theta) = \frac{1}{Z(\theta)} \sum_h e^{-E(v,h;\theta)} \quad (3)$$

Additionally, in some example embodiments, stacks of RBM may be trained (e.g., greedily trained) layer by layer to form all or part of a Deep Belief Network (DBN).

As implemented in various example embodiments, multiple layers of an s-CRBM may be used (e.g., by a popularity prediction machine) to machine-learn translation invariant object-shape filters from images of arbitrary sizes. An s-CRBM, as used herein, is a variant of RBM in which many hidden units share the same weights in a convolutional network. Additionally, in an s-CRBM, there is a sparsity term that encourages filters to learn interpretable shapes. A technique called probabilistic max-pooling may allow upper layers to learn increasingly larger shapes. In short, a popularity prediction machine may implement an s-CRBM to learn image filters that capture representative shapes from the training data.

In example embodiments explored by experiment, an s-CRBM was used to learn shapes in a set of item categories. Furthermore, a graphics processing unit (GPU) version of the s-CRBM was implemented to substantially speed up the learning process.

Prior to training the s-CRBM, the training images were first grayscaled and then whitened by 1/f to remove pair-wise correlations from the data. The purpose of this process was to encourage shape learning (e.g., learning item contours) as opposed to learning intensity variations in the images. According to certain example embodiments, background removal (e.g., using segmentation) is not performed on a training set, because, for example, s-CRBM may be robust to background noises. In example embodiments explored by experiment, the model usually learned shapes that are representative of the objects and not the background.

In example embodiments explored by experiment, two different sets of filters were trained using different scale/layer combinations. For the first set, a popularity prediction machine learned filters that encode rough overall shapes of items. For this purpose, multiple layers of filters were not built; instead, the popularity prediction machine scaled down 140×140 item images into small 24×24 images and then trained a single layer s-CRBM with 200 15×15 filters. This may be computationally much cheaper than learning upper layers while allowing the popularity prediction machine to learn many filters that capture overall shapes of items. One potential disadvantage of such a shallow s-CRBM, however, is that the first-layer features may be considered to be less invariant to various transformations. Additionally, by scaling down, it is possible for the popularity prediction machine to remove one or more important details from images.

Figure 2:
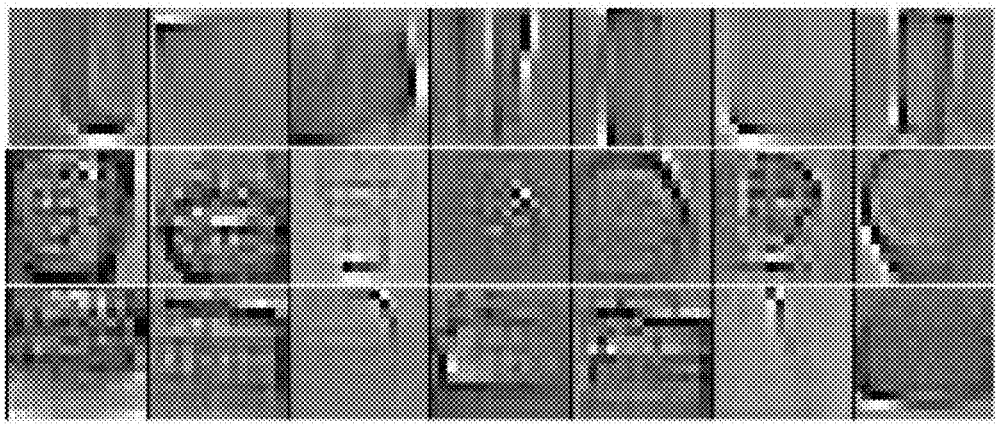
FIG. 2 is set of example images processed with a sparse Convolutional Restricted Boltzmann Machine (s-CRBM) layer 1 filter, according to some example embodiments.

FIG. 2 shows examples of the single-layer filters learned from a few different categories (e.g., at eBay®). As shown in FIG. 2, the filters captured the interpretable shapes from each category. The first row is filters learned from the "Women's Boots" category. The second row is from the "Wrist Watches" category. The last row is from the "Handbag" category.

For the second set of filters, the popularity prediction machine trained the second layer filters to use the first layer outputs as inputs. In the example embodiments explored by experiment, the first layer outputs resulted from 24 10×10 natural first-layer bases (e.g., oriented edge filters). The pooling ratio used was 3. Accordingly, each pixel learned from the second layer represented three pixels in the original raw image.

In the example embodiments explored by experiment, there were a total of 50 second layer filters per category of item. Each filter was 14×14 in size. Since the pooling ratio was 3, these filters are presented shapes as large as 42×42 in the original images. In the experiments, these second layer filters encoded item part shapes that retained more details than the first-layer overall shape filters.

Figure 3:
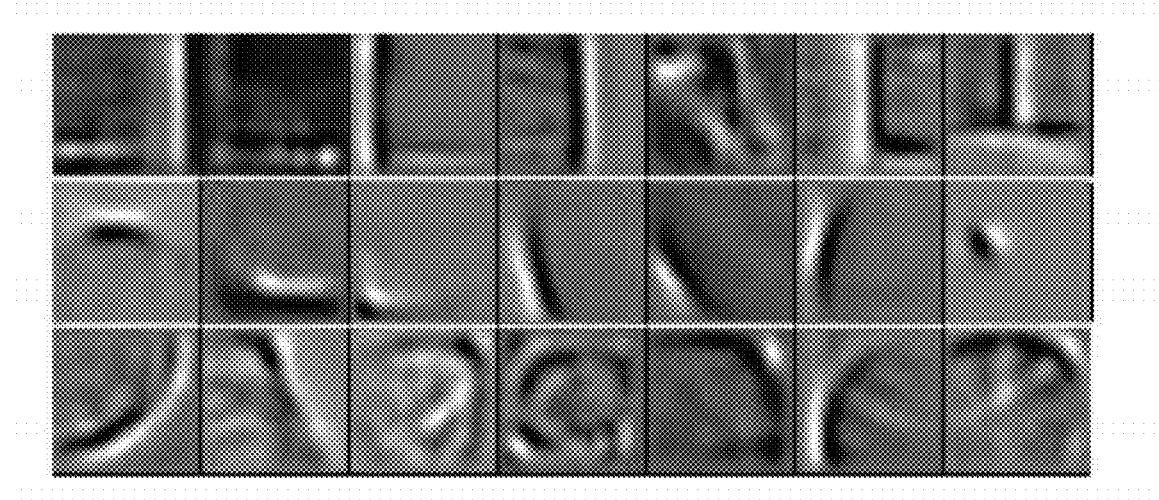
FIG. 3 is a set of example images processed with an s-CRBM layer 2 filter, according some example embodiments.

FIG. 3 visualizes the second layer filters selected from a few categories. In FIG. 3, the first row filters are learned from the "Cellphone" category. The second row filters are learned from the "Women's Heels" category. The last row filters are learned from the "Wrist Watches" category.

After the filters are learned, the actual image features may be extracted from each image (e.g., by the popularity prediction machine) by computing the hidden unit responses. In some example embodiments, the hidden unit response is computed as the probability of the hidden unit being "on" given the visible unit values:

$$p(h_j=1|v)=g(\Sigma_i W_{ij} v_i + a_j) \quad (4)$$

where $g(x)=1/(1+\exp(-x))$ is the sigmoid function.

According to certain example embodiments, the feature for a filter may be chosen as the maximum response value among convolutional unit responses. This may be intuitively interpreted as shape detection within an image with a moving filter window.

Other Features

Some example embodiments of the popularity prediction machine also use a Histogram of Oriented Gradients, linear regressions, and vector regressions. However, in the experiments conducted, few additional benefits were observed from these features. According to various example embodiments, the selection of particular categories of items may be based on their corresponding revenues (e.g., high revenues). In experiments conducted, the predicted popularity of items was by empirical data, including average clickthrough rates and conversion rates (e.g., sales) for the categories studied.

Popularity Score

The popularity of products (e.g., items) may be quantized, according to various example embodiments, using a function based on clicks (c), sales (s), a number of impressions (i), or any suitable combination thereof. Example embodiments explored by experiment were implemented with two variants of functions: a raw popularity score c+ks/i and a log popularity score log c+ks/i. The experiments used k=50 but did not use any position bias model for determining (e.g., estimating) this popularity score. According to the experimental data, the log popularity score distribution may be almost perfectly Gaussian. This data may suggest the raw popularity score distribution is a log-normal distribution. Some example embodiments use the log-normal distribution, due at least in part to its use in, for example, economics and finance to model asset prices. The log normal distribution has also been used, for example, in social and biological sciences.

Figure 4:
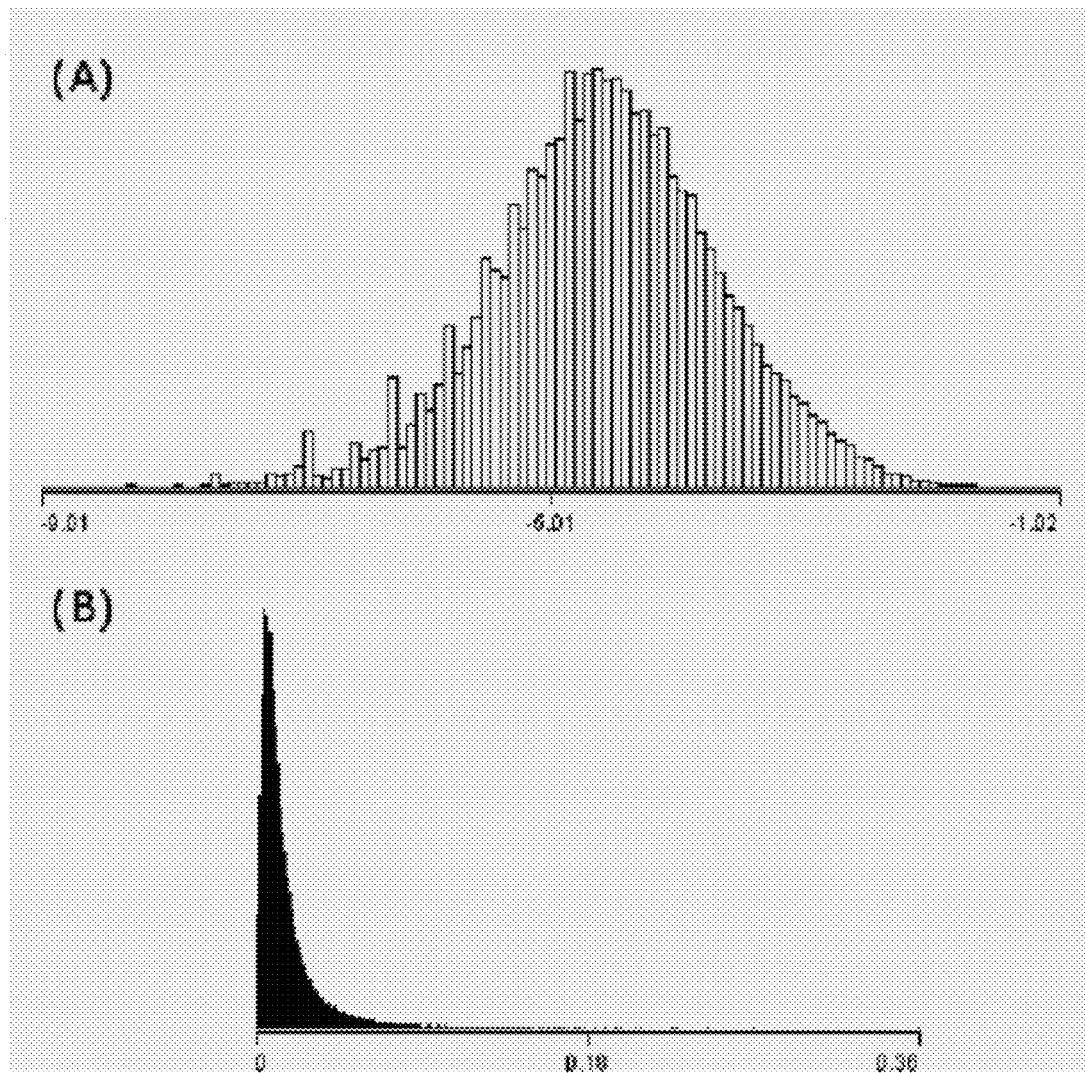
FIG. 4 is set of popularity score distributions, according to some example embodiments.

FIG. 4 shows the distributions of log popularity scores and raw popularity scores of items in the "wrist watch" category at eBay®. Distributions from other example categories exhibited similar results. In FIG. 4, the X-axis represents popularity scores, and the Y-axis represents the frequency of popularity scores. In distribution (A), the popularity scores are on a log scale (base e). In distribution (B), they are raw scores.

In the example embodiments explored by experiment, the log-normal popularity was used as the regression target. This may have the benefit of treating the regression model as a transformation function that maps all the features to a normal distribution. Although it may not be not necessary to have a normal distribution for a dependent variable (e.g., popularity score), the normality of the dependent variable nonetheless may be considered a nice property to have for obtaining the least mean square error for the regression.

Query-Image Relevance Score

According to various example embodiments, the popularity prediction machine may be configured to analyze relationships of items to queries (e.g., the relationship of a particular product or item to a particular query). Such a relationship may be quantified by a score that represents the relevance of the image to a query (e.g., a query-image relevance score). In such example embodiments, item image features may be related to a query within a visual dictionary that maps text tokens to image features. For example, a probabilistic model for each concept may be denoted as $$Pr(X|\text{concept}),$$

which may describe the distribution of image features for a particular concept. Accordingly, a dictionary of such concepts may be used to measure relevance of a query to a particular item image.

Some example embodiments of the popularity prediction machine may use a heuristic approach in which each text token is mapped to a vector of image features. Such a vector of image features may be computed as an average feature vector of all of the images with which the token is associated.

To build a visual dictionary, it may be advantageous to start with a large database of annotated images. For example, eBay® may have a large number of annotated images, since every item image that a seller uploads to eBay® is typically accompanied by the item's title and description (e.g., annotations for the image). Accordingly, the followings steps may be implemented by a popularity prediction machine to build one or more visual dictionaries from eBay®'s image data.

1. Collect a set of items, their titles, and their corresponding images. The items in the set may be from the same category (e.g., electronics or fashion).

2. Find the most frequent text tokens used in the titles of the items, and remove stop words and punctuation. The resulting collection of text tokens may be considered as "keys" of the visual dictionary.

3. For each item, extract one or more of the object image features mentioned above from the image of the item.

4. Extract text tokens from the item title.

5. Look for individual text tokens from the item title within the keys of the dictionary. If a token from the item's title is found, then the item's image features may be used in computing an average feature vector for the particular text token.

Once an average feature vector is obtained for a particular text token, then the relevance of a query to a particular item image may be measured by the popularity prediction machine. In particular, the popularity prediction machine may look up individual text tokens of the query in the visual dictionary for their average feature vectors, and then compute the inner products with the image features of the item in question. If there are multiple text tokens in the query, the popularity prediction machine may take the average of inner product results of all the text tokens in the query.

EXPERIMENTS

This section presents the results of various regression experiments performed using example embodiments of a popularity prediction machine and the features described in the previous sections. In particular, the experiments measured the performance of various models using two different metrics: RMSE and rank correlation. This section also describes data collection methods and some noteworthy characteristics in our datasets.

Data Preparation and Collection

In the experiments, between 30,000 and 80,000 random item images were collected from each of a dozen different categories from eBay. The experimenters chose eight different ecommerce categories for these experiments. Item categories may be organized as a multi-root k-ary tree. The root of the tree may represent a broad ecommerce category (e.g., fashion or electronics), and a leaf node may represent the lowest level of granularity. The experiments process images from four leaf categories and four intermediate categories.

For each individual category, a system (e.g., a popularity prediction machine) trained shallow and deep sparse RBM bases. Then, the system used these bases to extract the RBM features. Additionally, image quality features, colors, and textures were extracted by the system as described above.

Along with the item image features, the system collected item click counts, sales counts, and impression counts to compute the popularity score as discussed above. For the purposes of boosting confidence in the popularity scores, only items with at least 1000 impressions were chosen. Additionally, the system collected item titles and prices. The system then constructed a set of text features by extracting the top 200 most frequent title tokens for each category and ignoring the stop words. Then, the system constructed a multivariate binomial bag-of-words representation for each category. Accordingly, in these example embodiments, each item was represented by this 200 dimension Boolean vector in which each of the elements is either 0 or 1, based on whether the token is present in the item title or not. The approach of using multivariate binomial bag-of-words may have the effect of providing an idea about the kind of regression result to expect using text features.

According to various example embodiments, the image features are considered to carry a different type of information about the items compared to text and price features. Hence, example embodiments that process image features along with other text and price features for computing the item popularity score may provide better regression results. The experiments conducted focused primarily on the log normal popularity scores, for at least the reasons discussed above.

Duplicate Images

In the experiments, some categories of items had a high number of duplicate item images. Table 3 shows percentages of items with duplicate images and percentages of items with duplicate titles in two different categories. As shown in Table 3, duplicate images are more prevalent than duplicate titles. As an example, this may be due in part to different sellers rarely using the same titles when listing similar items but often uploading the same product images taken from elsewhere (e.g., a manufacturer's website). In a portion of the experiments, datasets without duplicate images were used and the resulting performance of the system was compared against performance of models trained on regular datasets.

TABLE 3

Percentages of duplicate images and duplicate titles in selected categories

| Category | Duplicate Images | Duplicate Titles |
|---|---|---|
| Women's Boots | .25 | .028 |
| Wrist Watches | .031 | .044 |
| Cameras & Photo | .373 | .139 |
| Automobiles | .323 | .135 |
| Computers & Networking | .367 | .103 |
| Clothing, Shoes, & Accessories | .059 | .03 |
| Books | .075 | .064 |

Regression Results for Different Feature Combinations

The experiments included a series of regression modeling experiments using different feature combinations in two categories: Women's Boots and Wrist Watches. For this purpose, models were constructed by the system using stochastic gradient boosted regression trees. These models were constructed from a training dataset using ten-fold cross validation. Additionally, a separate test dataset was used for evaluation of the model. Table 4 shows the RMSE of regression models for each experiment obtained from the test dataset. As shown, the regression error for an item's popularity may be reduced by incorporating all the image features along with the text and price features. In some of the categories, the impact of image features can be significant (e.g., Women's Boots). In fact, in the Women's Boots category, images alone performed better than the combination of the title features and the item price. As an example, this might be at least partly due to a model learning the image features of popular items, while titles of popular items may be a lot noisier. As another example, this may be at least partly due to a lack of an advanced set of text features in the experiments conducted. In any case, the experimental data indicate that, in a highly unstructured marketplace (e.g., eBay®), image features may add significant value in computing item popularity.

TABLE 4

Effect of features on accuracy against tests in RSME. Baseline is computed using averages learned from training sets of each category. In "No Dupes" categories, items with duplicate images were removed.

| Feature | Women's Boots | Women's Boots (No Dupes) | Wrist Watches | Wrist Watches (No Dupes) |
|---|---|---|---|---|
| Baseline | .770 | .728 | .902 | .899 |
| Text | .707 | .690 | .817 | .818 |
| Image (Photo) | .717 | .704 | .852 | .848 |
| Image (Semantic) | .681 | .698 | .851 | .853 |
| Image (Photo, Semantic) | .679 | .695 | .838 | .842 |
| Text, Price | .693 | .676 | .800 | .801 |
| Text, Image | .666 | .676 | .808 | .808 |
| Text, Image, Price | .660 | .668 | .75 | .791 |

Improving Shopping Search Ranking Model

Ranking based on item popularity may facilitate improvement of years of experience in interacting with an online search engine (e.g., a shopping search engine). In the experiments, the system measured the performance of various regression models using the Spearman's rank coefficient. For some measurements, rather than using all of the features, the system trained regression models using only image features to see how important image features are in different categories. Table 5 shows the results.

TABLE 5

Regression performance in different categories in terms of Spearman's ranking coefficient

| Category | Spearman's rho |
|---|---|
| Automobile Parts and Accessories | .57 |
| PC Laptops and Netbooks | .56 |
| Digital Cameras | .528 |
| Automobiles | .496 |
| Women's Boots | .469 |
| Computers and Networking | .356 |
| Wrist Watches | .346 |
| Cameras and Photo | .339 |
| Women's Boots (no duplicates) | .298 |
| Jewelry and Watches | .282 |
| Clothing, Shoes, and Accessories | .254 |
| Health and Beauty | .162 |
| Books | .151 |

Analysis of Regression Result

In the experiments, the image features were observed to perform extremely well in tech categories, including categories in which one might not usually think of visual characteristics as being important. As an example, this might be at least partially due to a high number of similar item images in these categories. Many items of similar popularity scores may be sharing the same or similar pictures. For instance, in the Digital Cameras category, even different pictures of similar cameras often have the similar view angles and item poses.

Moreover, the image features were observed to be less effective in categories like Health & Beauty and Books. As an example, training the models at sub-categories was observed to work better than training the models at parent-categories. For instance, models trained on "PC Laptops and Netbooks," "Automobile Parts and Accessories," and "Women's Boots" performed better than models trained on their parent categories. As an example, this may be due at least in part to the fact that at different levels among the categories, different features may be emphasized and thus grouping many different categories together may result in reduced performance. Table 6 shows top features in each category based on the corresponding information gained.

TABLE 6

Image features with top information gained in selected categories

| PC Laptops | Automobile Parts and Accessories | Women's Boots (no duplicates) |
|---|---|---|
| Brightness | An RBM feature | Background Mean Lightness |
| Aspects Ratio | An RBM feature | An RBM feature |
| An RBM feature | Foreground Colorfulness | Black Color |
| An RBM feature | An RBM feature | Aspect Ratio |

Interpreting Top Features

One potential advantage of using semantic image features is that each feature may have a visual interpretation. For example, from the feature ranking shown in Table 6, a significant feature features in the "Women's Boots" category is the black color. Additionally, in the experiments, the top RBM feature strongly corresponded to pictures of ankle boots, rather than long boots.

This was confirmed by experimental data on text features. The top 10 important tokens for "Women's Boots" include, among others, the words "ankle" and "black." Accordingly, a system configured to train models with interpretable semantic image features may be a useful tool in understanding consumer trends, particularly for visually driven categories like fashion.

Figure 5:
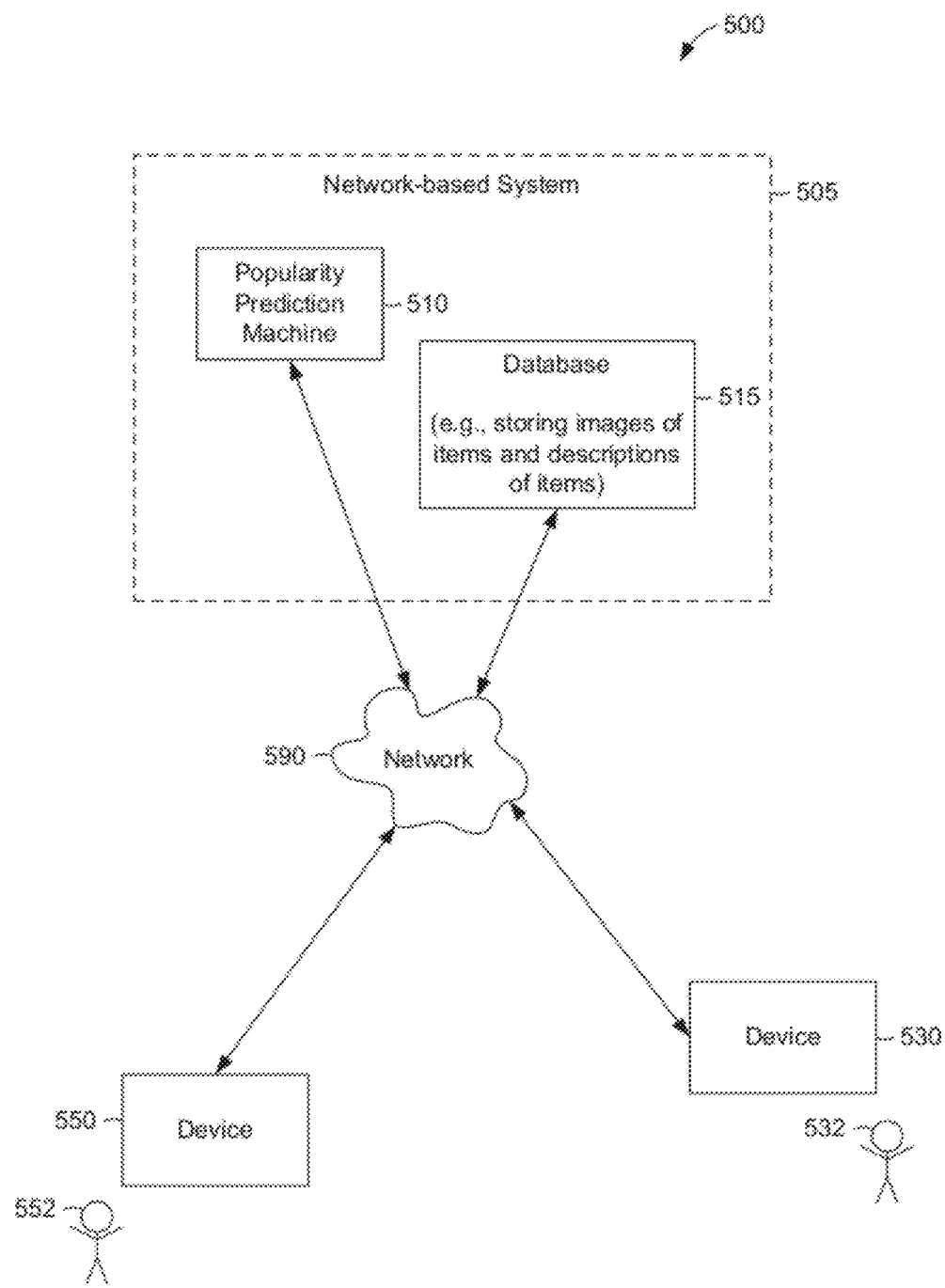
FIG. 5 is a network diagram illustrating a network environment suitable for image-based popularity prediction, according to some example embodiments.

FIG. 5 is a network diagram illustrating a network environment 500 suitable for image-based popularity prediction, according to some example embodiments. The network environment 500 includes a popularity prediction machine 510, a database 515, and devices 530 and 550, all communicatively coupled to each other via a network 590. The popularity prediction machine 510, the database 515, and the devices 530 and 550 may each be implemented in a computer system, in whole or in part, as described below with respect to FIG. 11.

As shown in FIG. 5, the popularity prediction machine 510, the database 515, or both, may form all or part of a network-based system 505. The network-based system 505 may be or include a network-based commerce system, a network-based publication system, a network-based listing system, a network-based media archival system, a network-based image sharing system, a network-based visual search engine, a network-based shopping search engine, or any suitable combination thereof. The database 515 may be configured to store images (e.g., images of items), descriptions (e.g., descriptions of items depicted in images), or any suitable combination thereof.

Also shown in FIG. 5 are users 532 and 552. One or both of the users 532 and 552 may be a human user (e.g., a human being), a machine user (e.g., a computer configured by a software program to interact with the device 530), or any suitable combination thereof (e.g., a human assisted by a machine or a machine supervised by a human). The user 532 is not part of the network environment 500, but is associated with the device 530 and may be a user of the device 530. For example, the device 530 may be a desktop computer, a vehicle computer, a tablet computer, a navigational device, a portable media device, or a smart phone belonging to the user 532. Likewise, the user 552 is not part of the network environment 500, but is associated with the device 550. As an example, the device 550 may be a desktop computer, a vehicle computer, a tablet computer, a navigational device, a portable media device, or a smart phone belonging to the user 552.

Any of the machines, databases, or devices shown in FIG. 5 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines illustrated in FIG. 5 may be combined into a single machine, and the functions described herein for any single machine may be subdivided among multiple machines.

The network 590 may be any network that enables communication between machines (e.g., popularity prediction machine 510 and the device 530). Accordingly, the network 590 may be a wired network, a wireless network (e.g., a mobile or cellular network), or any suitable combination thereof. The network 590 may include one or more portions that constitute a private network, a public network (e.g., the Internet), or any suitable combination thereof.

Figure 6:
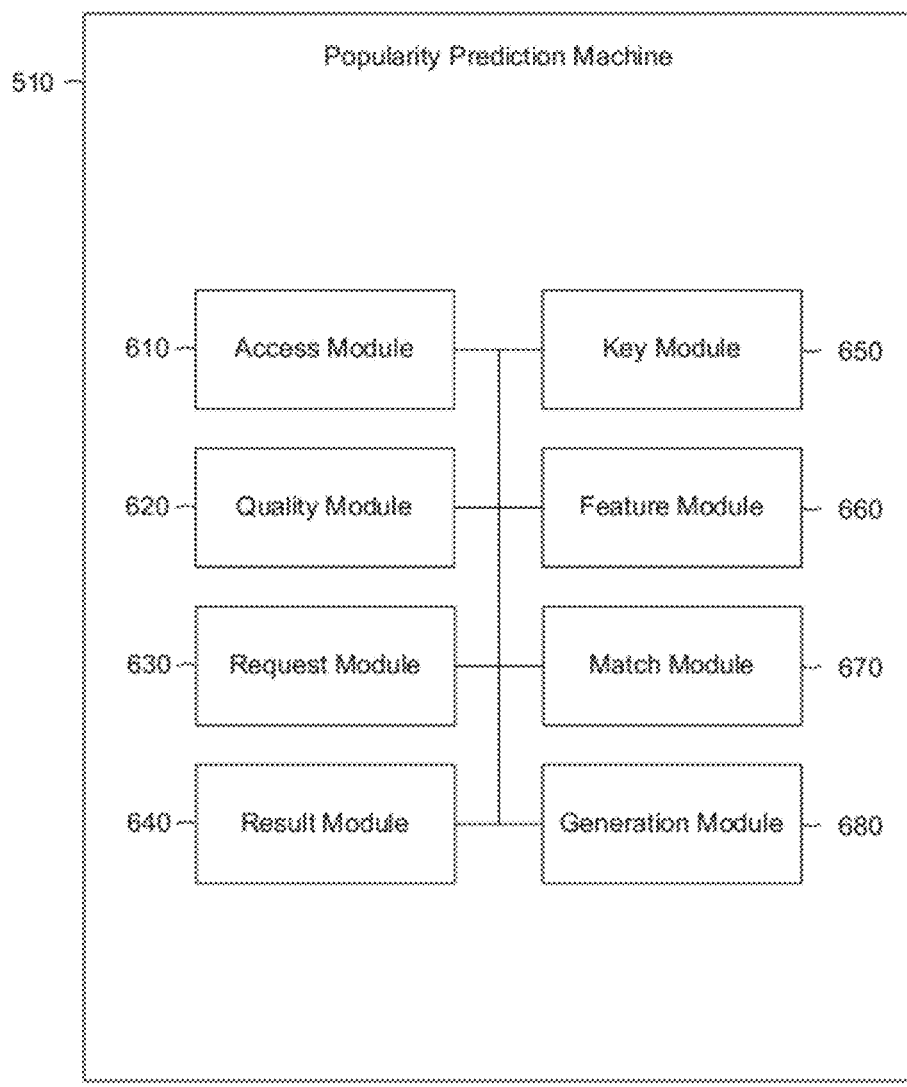
FIG. 6 is a block diagram illustrating components of a popularity prediction machine, according to some example embodiments.

FIG. 6 is a block diagram illustrating components of the popularity prediction machine 510, according to some example embodiments. In the example shown, the popularity prediction machine 510 includes an access module 610, a quality module 620, a request module 630, a result module 640, a key module 650, a feature module 660, a match module 670, and a generation module 680, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. The modules of the popular prediction machine 510 may be configured to perform one or more functions discussed below with respect to FIG. 7-10.

Figure 7:
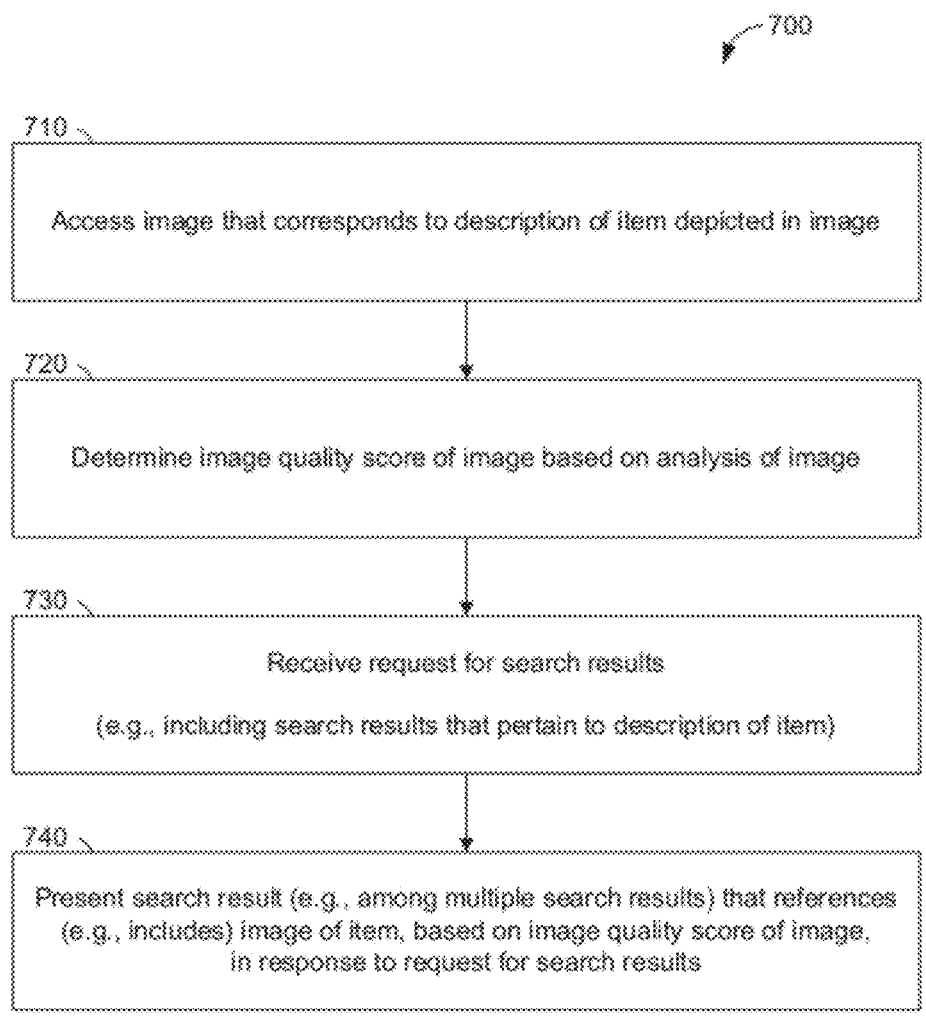
FIG. 7-8 are flowcharts illustrating a method of presenting a search result that references an image based on an image quality score of the image, according to some example embodiments.
Figure 8:
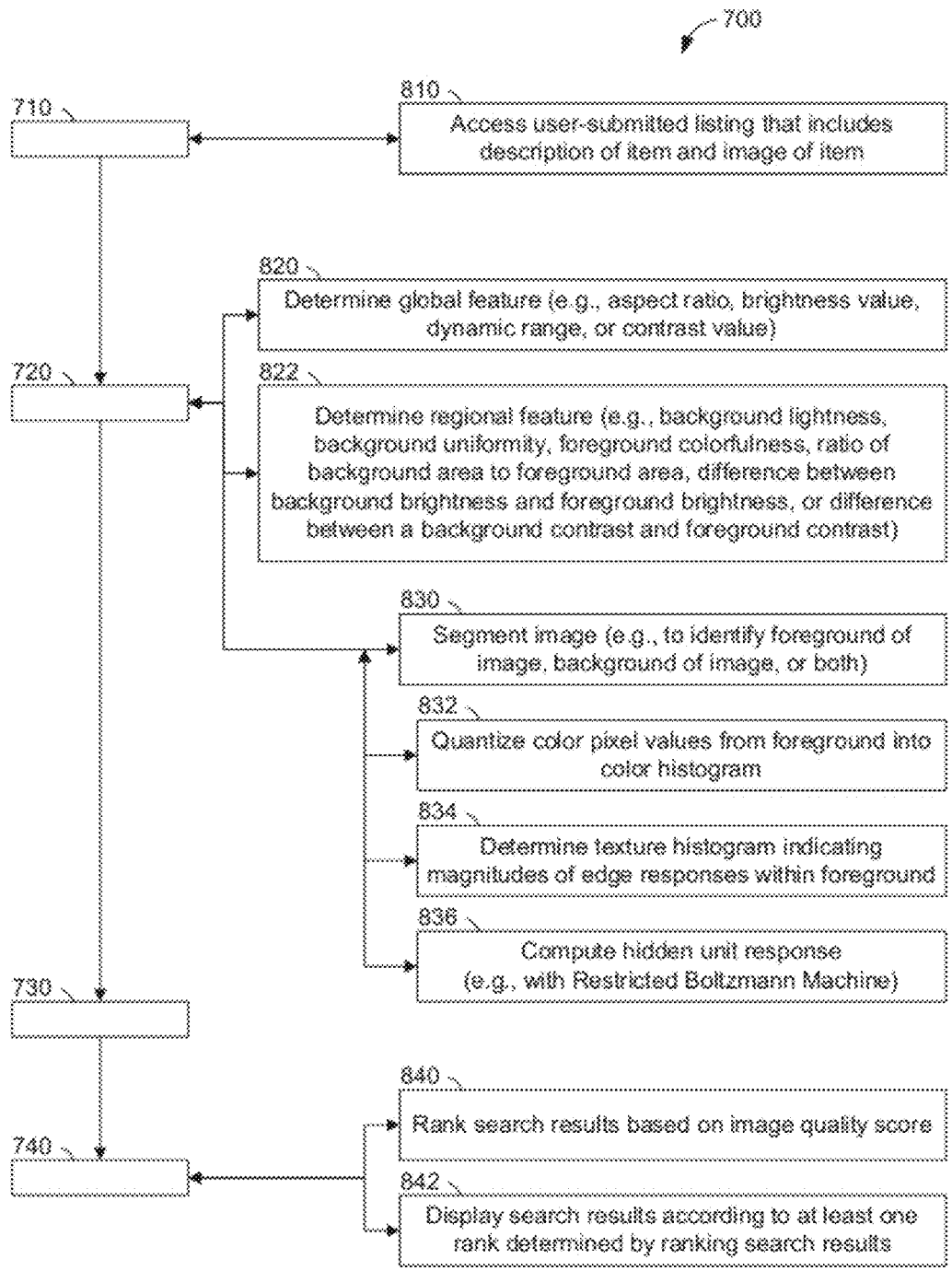

FIG. 7-8 are flowcharts illustrating a method 700 of presenting a search result that references an image, based on an image quality score of the image, according to some example embodiments. Operations in the method 700 may be performed by the popularity prediction machine 510, using modules described above with respect to FIG. 6. As shown in FIG. 7, the method 700 may include operations 710, 720, 730, and 740.

In operation 710, the access module 610 accesses an image that corresponds to a description of an item that is depicted in the image. For example, the access module 610 may access the database 515, which may be storing the image.

In operation 720, the quality module 620 determines an image quality score of the image accessed in operation 710. The image quality score may be determined based on an analysis of the image. For example, the analysis of the image may determine one or more image features described above (e.g., with respect to FIG. 1-4).

In operation 730, the request module 630 receives a request for search results. For example, the request module 630 may receive a query submitted by the user 532 from the device 530. One or more of the search results requested in the request may pertain to the description of the item depicted in the image accessed in operation 710. The request module 630 may retrieve one or more of the requested search results from a database (e.g., database 515), from a search engine, or any suitable combination thereof.

In operation 740, the result module 640 presents one or more search results. For example, the result module 640 may present a search result that is referential of the image of the item. That is, the result module 640 may present a search result that references (e.g., links to) or includes the image of the item. The presenting of the search result may be based on the image quality score of the image. Moreover, the presenting of the search result may be in response to the request received in operation 730.

As shown in FIG. 8, the method 700 may include one or more of operations 810, 820, 822, 830, 832, 834, 836, 840, and 842. Operation 810 may be performed as part (e.g., a precursor task, a subroutine, or a portion) of operation 710, in which the access module 610 accesses the image that corresponds to the description of the item depicted in the image. In operation 810, the access module 610 accesses a user-submitted listing (e.g., submitted by the user 532 via the device 530). The user-submitted listing may include the description of the item and may include the image of the item. For example, the user 532 may submit the listing as an advertisement of the item, and the description and the image may be contained within the listing.

One or more of operations 820, 822, 830, 832, 834, and 836 may be performed as part (e.g., a precursor task, a subroutine, or a portion) of operation 720, in which the quality module 620 determines the image quality score of the image. In operation 820, the quality module 620 determines a global feature (e.g., global image feature) of the image. As noted above, examples of such a global feature include an aspect ratio of the image that depicts the item, a brightness value of the image, a dynamic range of the image, and a contrast value of the image.

In operation 822, the quality module 620 determines a regional feature (e.g., regional image feature) of the image. As noted above, examples of such a regional feature include a background lightness of the image that depicts the item, a background uniformity of the image, a foreground colorfulness of the image, a ratio of a background area to a foreground area in the image, a difference between a background brightness and a foreground brightness of the image, and a difference between a background contrast and a foreground contrast of the image.

In operation 830, the quality module 620 segments the image that depicts the item. For example, the quality module 620 may segment the image into a foreground (e.g., a foreground portion of the image) and a background (e.g., a background portion of the image). Accordingly, the quality module 620 may identify the foreground, background, or both, within the image.

In operation 832, the quality module 620 quantizes one or more color pixel values from the foreground of the image. Moreover, the quality module 620 may generate or modify a color histogram based on the one or more quantized color pixel values, as discussed above. Accordingly, performance of operation 832 may involve quantizing color pixel values from the foreground of the image into a color histogram that corresponds to the image. The determining of the image quality score in operation 720 may be based on the color histogram, one or more of the quantized color pixel values, or any suitable combination thereof.

In operation 834, the quality module 620 determines (e.g., generates or modifies) a texture histogram of the image that depicts the item. For example, the texture histogram may indicate one or more magnitudes of edge responses within the foreground of the image, as discussed above. The determining of the image quality score in operation 720 may be based on the texture histogram, one or more of the magnitudes of edge responses in the foreground, or any suitable combination thereof.

In operation 836, the quality module 620 computes one or more hidden unit responses with a Restricted Boltzmann Machine, as discussed above. The determining of the image quality score in operation 720 may be based on one or more of these hidden unit responses.

One or more of operations 840 and 842 may be performed as part (e.g., a precursor task, a subroutine, or a portion) of operation 740, in which the result module 640 presents one or more search results. In operation 840, the result module 640 ranks one or more search results based on the image quality score determined in operation 720. That is, the result module 640 may determine one or more ranks for at least some of the search results discussed above with respect to operation 730 and 740. For example, a group of search results may be retrieved by the request module 630 during performance of operation 730, and the result module 640 may perform operation 840 by ranking (e.g., reordering) at least some of the retrieved search results based on the image quality score.

In operation 842, the result module 640 displays the one or more search results according to the ranking performed in operation 840. For example, at least one of the search results may be displayed by the result module 640 (e.g., by communication with the device 530) according to a rank determined in operation 840.

Figure 9:
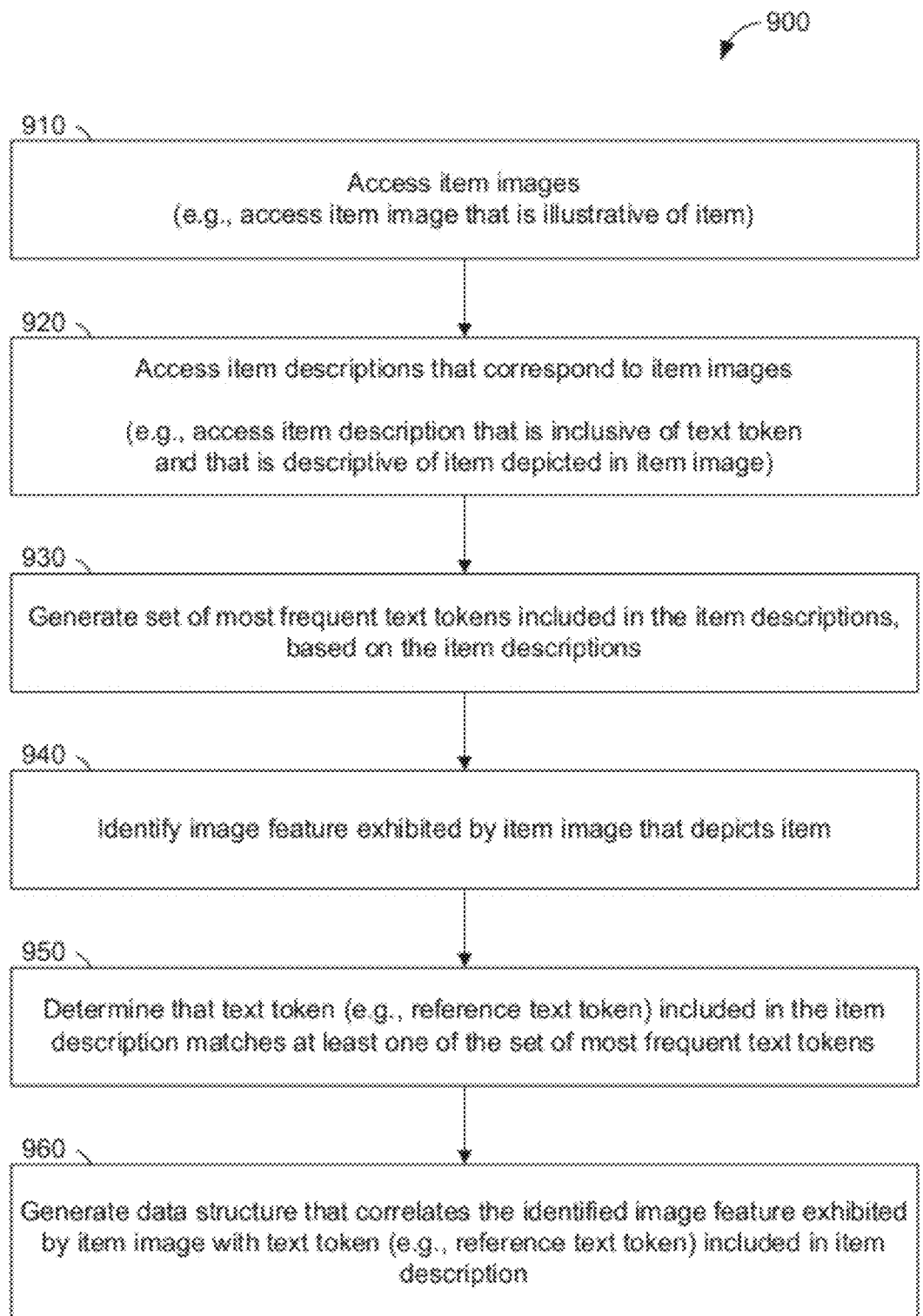
FIG. 9-10 are flowcharts illustrating a method of correlating an identified image feature exhibited by an item image with a text token included in an item description, according some example embodiments.
Figure 10:
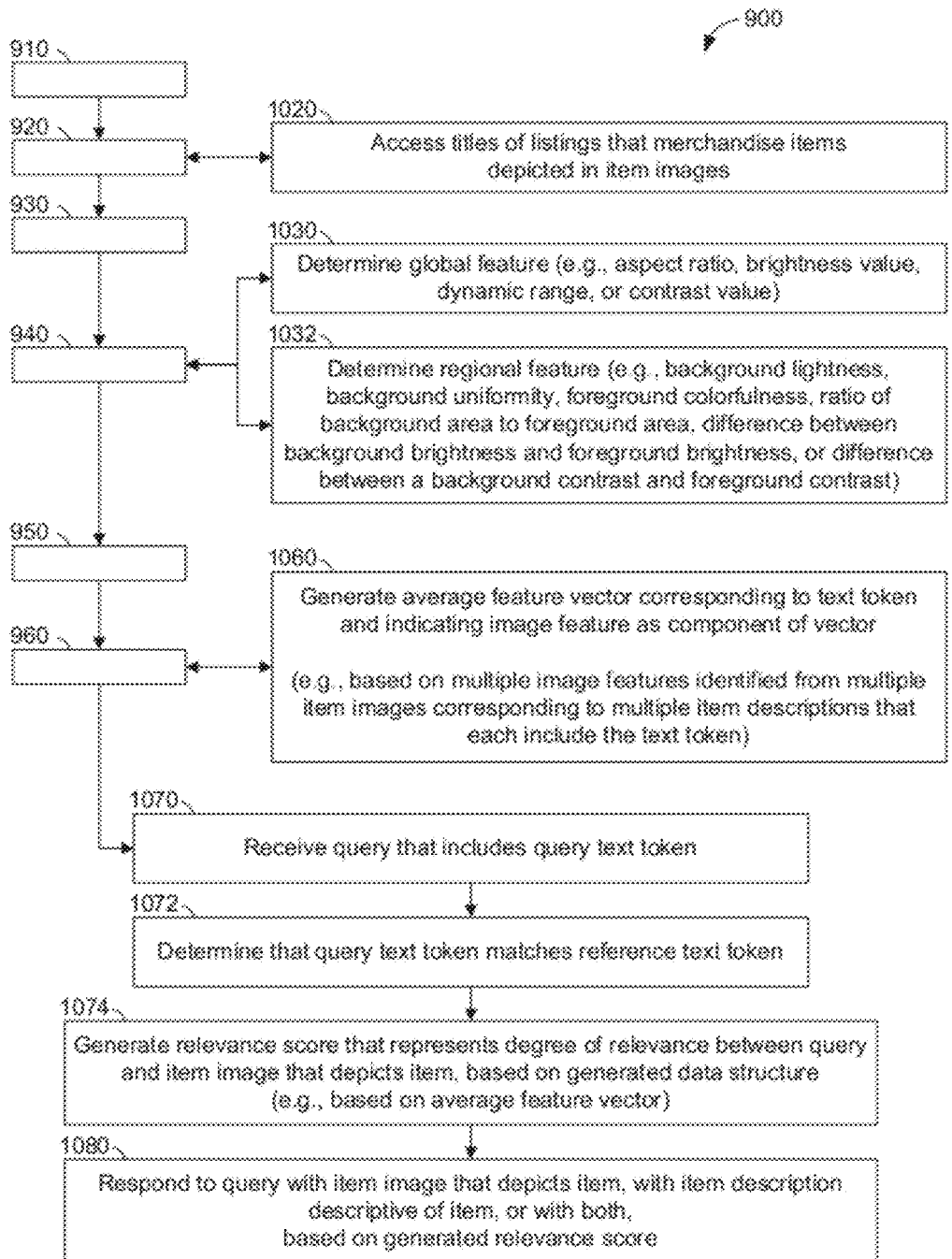

FIG. 9-10 are flowcharts illustrating a method 900 of correlating an identified image feature exhibited by an item image with a text token included in an item description, according some example embodiments. As used herein, an "item image" is an image that depicts an item therein, and a corresponding "item description" is a description of the item depicted in that item image. Operations in the method 900 may be performed by the popularity prediction machine 510, using modules described above with respect to FIG. 6. As shown in FIG. 9, the method 900 may include operations 910, 920, 930, 940, 950, and 960.

In operation 910, the access module 610 accesses item images (e.g., a group or set of item images, which may be stored in the database 515). For example, the access module 610 may access the database 515 to access all or part of the item images. The item images may include an item image that is illustrative of an item (e.g., an item image that depicts an item therein).

In operation 920, the access module 610 accesses item descriptions (e.g., a group or set of item descriptions, which may be stored in the database 515). The item descriptions may respectively correspond to the item images accessed in operation 910. For example, the access module 610 may access the database 515 to access all or part of the item descriptions. The item descriptions may include an item description that is inclusive of a text token (e.g., an item description that includes a text token, such as a word, abbreviation, or other character string). Moreover, the item description may be descriptive of the item illustrated in the item image discussed above with respect to operation 910. In other words, the item description and the item image may both correspond to the same item and describe the same item (e.g., visually or in text).

In operation 930, the key module 650 generates a set of most frequent text tokens included in the item descriptions accessed in operation 920. The set of most frequent text tokens may be generated based on the item descriptions themselves (e.g., based on text tokens included within the item descriptions).

In operation 940, the feature module 660 identifies an image feature (e.g., a global feature or a regional feature, as discussed above) exhibited by the item image that depicts the item described by the item description. That is, the feature module 660 may analyze one of the item images and accordingly identify one or more image features of that item image. According to various example embodiments, the feature module 660 may perform (e.g., repeat) operation 940 with respect to some or all of the item images accessed in operation 910.

In operation 950, the match module 670 determines that the text token included in the item description (e.g., that corresponds to the item image analyzed in operation 940) matches at least one of the set of most frequent text tokens generated in operation 930. That is, the match module 670 may determine that at least one of the text tokens in the item description is among a set of most frequent text tokens found in the item descriptions accessed in operation 920.

In operation 960, the generation module 680 generates a data structure (e.g., a map, a table, an index, a data record, or a spreadsheet) that correlates the image feature identified in operation 940 with the text token determined in operation 950 to match at least one of the set of most frequent text tokens. This may facilitate relating each of the most frequent text tokens to corresponding image features that have been identified from item images that correspond to item descriptions containing those most frequent text tokens. Accordingly, such relationships between text tokens and image features may form all or part of a visual dictionary from which the relevance of an item image to a piece of text (e.g., a query that includes one or more keywords) may be determined, estimated, or predicted.

As shown in FIG. 10, the method 900 may include one or more of operations 1020, 1030, 1032, 1060, 1070, 1072, 1074, and 1080. Operation 1020 may be performed as part (e.g., a precursor task, a subroutine, or a portion) of operation 920, in which the access module 610 accesses the item descriptions that correspond to the item images. In operation 1020, one of the item descriptions may be a title of a listing that merchandises an item depicted in an item image, and the access module 610 accesses the item description by accessing the title of the listing.

One or more of operations 1030 and 1032 may be performed as part of operation 940, in which the feature module 660 identifies an image feature exhibited by the item image that depicts the item described by the item description. In operation 1030, the feature module 660 determines a global feature (e.g., global image feature) of the item image. As noted above, examples of such a global feature include an aspect ratio of the item image illustrative of the item, a brightness value of the item image, a dynamic range of the item image, and a contrast value of the item image.

In operation 1032, the feature module 660 determines a regional feature (e.g., regional image feature) of the item image. As noted above, examples of such a regional feature include a background lightness of the item image illustrative of the item, a background uniformity of the item image, a foreground colorfulness of the item image, a ratio of a background area to a foreground area in the item image, a difference between a background brightness and a foreground brightness of the item image, and a difference between a background contrast and a foreground contrast of the item image.

Operation 1060 may be performed as part (e.g., a precursor task, a subroutine, or a portion) of operation 960, in which the generation module 680 generates the data structure that correlates the image feature with the text token. In operation 1060, the generation module 680 generates an average feature vector that corresponds to the text token. This average feature vector may indicate the identified image feature is a component of the average feature vector of the text token. That is, the average feature vector may include multiple components thereof, or each of the multiple components corresponds to one of multiple image features correlated with the text token, and the average feature vector may indicate that the image feature identified in operation 940 is one such component. According to some example embodiments, the generating of the average feature vector in operation 1060 may be based on multiple image features (e.g., global features, regional features, or any suitable combination thereof) identified from multiple item images, where the multiple item images may correspond to multiple item descriptions that are each inclusive of the text token.

One or more of operations 1070, 1072, 1074, and 1080 may be performed subsequent to operation 960, in which the generation module 680 generates the data structure that correlates the image feature with the text token. According to various example embodiments, the text token may be referred to as a "reference text token," and this reference text token, which is correlated with the image feature identified in operation 940, may be used to determine, predict, or estimate the relevance of one or more images to other text tokens or text phrases (e.g., queries) containing them.

In operation 1070, the request module 630 receives a query (e.g., a submission of one or more search criteria) that includes a text token. For clarity (e.g., disambiguation from the reference text token), this text token included in the query may be referred to as a "query text token."

In operation 1072, the match module 670 determines that the query text token matches the reference text token. As noted above, the reference text token may be correlated with the image feature identified in operation 940.

In operation 1074, the generation module 680 generates a relevance score. The relevance score may represent a degree of relevance between the query received in operation 1070 and the item image that depicts the item (e.g., the item image accessed in operation 910). The generation of the relevance score may be based on the data structure generated in operation 960 (e.g., the data structure that correlates the image feature exhibited by the item image with the reference text token). According to various example embodiments, this data structure may be an average feature vector (e.g., generated in operation 1060), and operation 1074 may be performed based on this average feature vector. As noted above, the average feature vector of the reference text token may indicate the image feature identified in operation 940 as a component of the average feature vector.

In operation 1080, the result module 640 response to the query received in operation 1070. The result module 640 may respond to the query by presenting (e.g., displaying via the device 530) the item image that depicts the item (e.g., the item image accessed in operation 910), presenting the item description that describes the item (e.g., the item description accessed in operation 920), or both. Moreover, operation 1080 may be performed based on the relevance score generated in operation 1074.

According to various example embodiments, one or more of the methodologies described herein may facilitate determining, predicting, or estimating a level of popularity for an image (e.g., an item image), and accordingly, a level of popularity for an item depicted therein. Moreover, one or more of the methodologies described herein may facilitate determining, predicting, or estimating a level of relevance of an image to a query that includes a text token. Hence, one or more of the methodologies described herein may facilitate image-based prediction of popularity and relevance for items that are associated with (e.g., represented by) images.

When these effects are considered in aggregate, one or more of the methodologies described herein may obviate a need for certain efforts or resources that otherwise would be involved in determining, predicting, or estimating levels of relevance or popularity for objects that are associated with images. Efforts expended by a user in analyzing images of items, descriptions of items, or both may be reduced by one or more of the methodologies described herein. Computing resources used by one or more machines, databases, or devices (e.g., within the network environment 500) may similarly be reduced. Examples of such computing resources include processor cycles, network traffic, memory usage, data storage capacity, power consumption, and cooling capacity.

Figure 11:
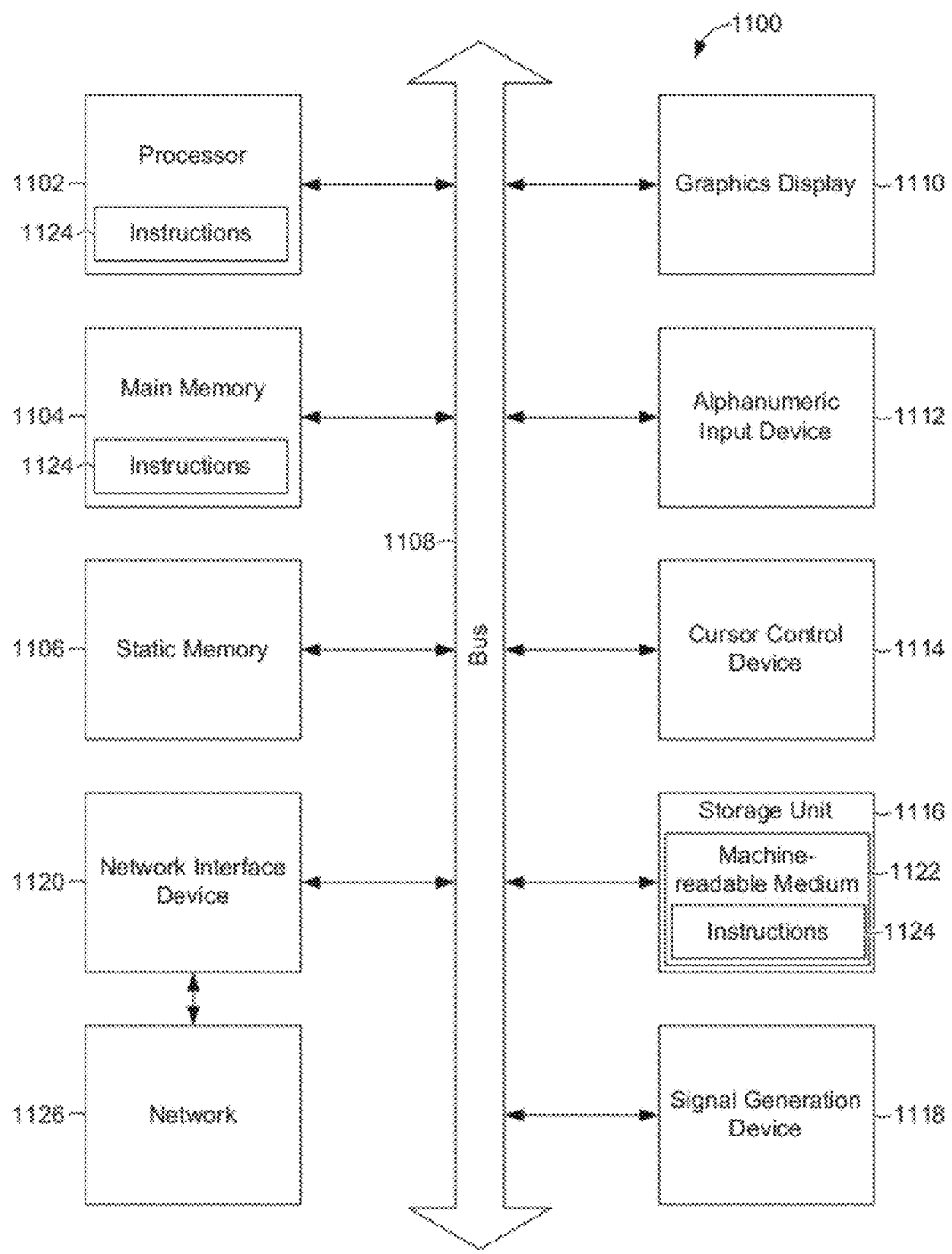
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system and within which instructions 1124 (e.g., software, a program, an application, an applet, an app, or other executable code) for causing the machine 1100 to perform any one or more of the methodologies discussed herein may be executed. In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a peer-to-peer (or distributed) network environment. The machine 1100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include a collection of machines that individually or jointly execute the instructions 1124 to perform any one or more of the methodologies discussed herein.

The machine 1100 includes a processor 1102 (e.g., a central processing unit (CPU), a GPU, a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The machine 1100 may further include a graphics display 1110 (e.g., a plasma display panel (PDP), a light emitting diode (LED) display, a liquid crystal display (LCD), a projector, or a cathode ray tube (CRT)). The machine 1100 may also include an alphanumeric input device 1112 (e.g., a keyboard), a cursor control device 1114 (e.g., a mouse, a touchpad, a trackball, a joystick, a motion sensor, or other pointing instrument), a storage unit 1116, a signal generation device 1118 (e.g., a speaker), and a network interface device 1120.

The storage unit 1116 includes a machine-readable medium 1122 on which is stored the instructions 1124 embodying any one or more of the methodologies or functions described herein. The instructions 1124 may also reside, completely or at least partially, within the main memory 1104, within the processor 1102 (e.g., within the processor's cache memory), or both, during execution thereof by the machine 1100. Accordingly, the main memory 1104 and the processor 1102 may be considered as machine-readable media. The instructions 1124 may be transmitted or received over a network 1126 (e.g., network 190) via the network interface device 1120.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1100), such that the instructions, when executed by one or more processors of the machine (e.g., processor 1102), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:

accessing an image that corresponds to a description of an item depicted in the image;

determining an image quality score of the image that depicts the item and corresponds to the description of the item, the determining of the image quality score of the image including segmenting the image to identify a foreground of the image and a background of the image and determining a brightness difference between the segmented background of the image and the segmented foreground of the image, the determined image quality score representing a degree of clarity with which the image shows the item in the segmented foreground of the image, the determining of the image quality score being performed by a processor of a machine based on an analysis of the image that depicts the item;

receiving a request for search results of which at least some pertain to the description of the item depicted in the image; and presenting a search result that is referential of the image of the item based on the image quality score of the image and in response to the request for the search results of which at least some pertain to the description of the item depicted in the image, the presenting of the search result being performed by a processor of a machine.

2. The method of claim 1, wherein:
the accessing of the image includes accessing a user-submitted listing that includes the description of the item and the image of the item.

3. The method of claim 1, wherein:
the presenting of the search result based on the image quality score includes ranking the search results based on the image quality score and displaying the search results according to at least one rank determined by the ranking of the search results.

4. The method of claim 1, wherein:
the determining of the image quality score based on the analysis of the image includes quantizing color pixel values from the foreground of the image that depicts the item into a color histogram.

5. The method of claim 1, wherein:
the determining of the image quality score based on the analysis of the image includes determining a texture histogram that indicates magnitudes of edge responses within the foreground of the image that depicts the item.

6. The method of claim 1, wherein:
the determining of the image quality score based on the analysis of the image includes computing a hidden unit response with a Restricted Boltzmann Machine.

7. The method of claim 1, wherein:
the determining of the image quality score based on the analysis of the image includes determining a global feature selected from a group consisting of:
an aspect ratio of the image that depicts the item,
a brightness value of the image,
a dynamic range of the image, and
a contrast value of the image.

8. The method of claim 1, wherein:
the determining of the image quality score based on the analysis of the image includes determining a regional feature selected from a group consisting of:
a background lightness of the image that depicts the item,
a background uniformity of the image,
a foreground colorfulness of the image,
a ratio of background area to foreground area in the image, and
a difference between a background contrast and a foreground contrast of the image.

9. A non-transitory machine-readable storage medium comprising instructions that, when executed by one or more processors of a machine, cause the machine to perform operations comprising:
accessing an image that corresponds to a description of an item depicted in the image;
determining an image quality score of the image that depicts the item and corresponds to the description of the item, the determining of the image quality score of the image including segmenting the image to identify a foreground of the image and a background of the image and determining a brightness difference between the segmented background of the image and the segmented foreground of the image, the determined image quality score representing a degree of clarity with which the image shows the item in the segmented foreground of the image, the determining of the image quality score being performed by the one or more processors of the machine based on an analysis of the image that depicts the item;
receiving a request for search results of which at least some pertain to the description of the item depicted in the image; and
presenting a search result that is referential of the image of the item based on the image quality score of the image and in response to the request for the search results of which at least some pertain to the description of the item depicted in the image.

10. A system comprising:
an access module configured to access an image that corresponds to a description of an item depicted in the image;
a processor configured by a quality module to determine an image quality score of the image that depicts the item and corresponds to the description of the item, the determining of the image quality score of the image including segmenting the image to identify a foreground of the image and a background of the image and determining a brightness difference between the segmented background of the image and the segmented foreground of the image, the determined image quality score representing a degree of clarity with which the image shows the item in the segmented foreground of the image, the determining of the image quality score being based on an analysis of the image that depicts the item;
a request module configured to receive a request for search results of which at least some pertain to the description of the item depicted in the image; and
a processor configured by a result module to present a search result that is referential of the image of the item based on the image quality score of the image and in response to the request for the search results of which at least some pertain to the description of the item depicted in the image.

11. The system of claim 10, wherein:
the result module is configured to rank the search results based on the image quality score and display the search results according to at least one rank determined by the ranking of the search results.

12. A method comprising:
accessing item images that include an item image illustrative of an item;
accessing item descriptions that correspond to the item images and include an item description inclusive of a text token and descriptive of the item depicted in the item image;
generating a set of most frequent text tokens included in the item descriptions based on the item descriptions;
identifying an image feature exhibited by the item image that depicts the item described by the item description, the identifying of the image feature including segmenting the image to identify a foreground of the image and a background of the image and determining a brightness difference between the segmented background of the image and the segmented foreground of the image as the identified image feature, the identifying of the image feature being performed by a processor of a machine;

determining that the text token included in the item description matches at least one of the generated set of most frequent text tokens included in the item descriptions; and generating a data structure that correlates the e identified image feature exhibited by the item image with the text token included in the item description determined to match at least one of the generated set of most frequent text tokens, the generating of the data structure being performed by a processor of a machine.

13. The method of claim 12, wherein:
the generating of the data structure includes generating an average feature vector that corresponds to the text token and indicates the identified image feature is a component of the average feature vector of the text token.

14. The method of claim 13, wherein:
the generating of the average feature vector is based on multiple image features identified from multiple item images that correspond to multiple item descriptions that are each inclusive of the text token.

15. The method of claim 12, wherein:
the item description is a title of a listing that merchandises the item depicted in the item image.

16. The method of claim 12, wherein:
the text token is a reference text token correlated with the identified image feature by the generated data structure; and the method further comprises:
receiving a query that includes a query text token;
determining that the query text token matches the reference text token correlated with the identified image feature; and
generating a relevance score that represents a degree of relevance between the query and the item image that depicts the item, the generating of the relevant score being based on the data structure that correlates the image feature exhibited by the item image with the text token included in the item description.

17. The method of claim 16, wherein:
the generating of the relevance score is based on an average feature vector that corresponds to the text token and indicates the identified image feature is a component of the average feature vector of the text token.

18. The method of claim 12, wherein:
the identifying of the image feature exhibited by the item image includes determining a global feature selected from a group consisting of:
an aspect ratio of the item image illustrative of the item,
a brightness value of the item image,
a dynamic range of the item image, and
a contrast value of the item image.

19. The method of claim 12, wherein:
the identifying of the image feature exhibited by the item image includes determining a regional feature selected from a group consisting of:
a background lightness of the item image illustrative of the item,
a background uniformity of the item image,
a foreground colorfulness of the item image,
a ratio of background area to foreground area in the item image,
and
a difference between a background contrast and foreground contrast of the item image.

20. A non-transitory machine-readable storage medium comprising instructions that, when executed by one or more processors of a machine, cause the machine to perform operations comprising:
accessing item images that include an item image illustrative of an item;
accessing item descriptions that correspond to the item images and include an item description inclusive of a text token and descriptive of the item depicted in the item image;
generating a set of most frequent text tokens included in the item descriptions based on the item descriptions;
identifying an image feature exhibited by the item image that depicts the item described by the item description, the identifying of the image feature including segmenting the image to identify a foreground of the image and a background of the image and determining a brightness difference between the segmented background of the image and the segmented foreground of the image as the identified image feature, the identifying of the image feature being performed by the one or more processors of the machine;
determining that the text token included in the item description matches at least one of the generated set of most frequent text tokens included in the item descriptions; and
generating a data structure that correlates the identified image feature exhibited by the item image with the text token included in the item description determined to match at least one of the generated set of most frequent text tokens.

21. A system comprising:
an access module configured to access item images that include an item image illustrative of an item; and to
access item descriptions that correspond to the item images and include an item description inclusive of a text token and descriptive of the item depicted in the item image;
a key module configured to generate a set of most frequent text tokens included in the item descriptions based on the item descriptions;
a processor configured by a feature module to identify an image feature exhibited by the item image that depicts the item described by the item description, the identifying of the image feature including segmenting the image to identify a foreground of the image and a background of the image and determining a brightness difference between the segmented background of the image and the segmented foreground of the image as the identified image feature, the identifying of the image feature being performed by a processor of a machine;
a match module configured to determine that the text token included in the item description matches at least one of the generated set of most frequent text tokens included in the item descriptions; and
a processor configured by a generation module to generate a data structure that correlates the identified image feature exhibited by the item image with the text token included in the item description determined to match at least one of the generated set of most frequent text tokens.

* * * * *

UNITED STATES PATENT AND TRADEMARK OFFICE
CERTIFICATE OF CORRECTION

| | |
|---|---|
| PATENT NO. | : 8,977,629 B2 |
| APPLICATION NO. | : 13/462179 |
| DATED | : March 10, 2015 |
| INVENTOR(S) | : Goswami et al. |

Page 1 of 1

It is certified that error appears in the above-identified patent and that said Letters Patent is hereby corrected as shown below:

Title page

Page 2, in column 2, under (56) "Other Publications", line 24, delete "SEarch"," and insert --Search",--, therefor

Claims

In column 27, line 5, in Claim 12, after "the", delete "e", therefor

In column 27, line 62, in Claim 19, after "and", insert --a--, therefor

Signed and Sealed this
Seventeenth Day of November, 2015

Michelle K. Lee
*Director of the United States Patent and Trademark Office*